US008634632B2

(12) United States Patent
Numata et al.

(10) Patent No.: US 8,634,632 B2
(45) Date of Patent: Jan. 21, 2014

(54) PAPER SHEET MANAGEMENT SYSTEM, PAPER SHEET RECOGNITION APPARATUS, PAPER SHEET MANAGEMENT APPARATUS, PAPER SHEET MANAGEMENT METHOD AND PAPER SHEET MANAGEMENT PROGRAM

(75) Inventors: Toshio Numata, Kawasaki (JP); Shoji Tomiya, Funabashi (JP); Gui Fu, Tokyo (JP); Hajime Morino, Kasukabe (JP)

(73) Assignee: Glory Ltd., Himeji-Shi, Hyogo-Ken (JP)

( * ) Notice: Subject to any disclaimer, the term of this patent is extended or adjusted under 35 U.S.C. 154(b) by 172 days.

(21) Appl. No.: 12/737,684

(22) PCT Filed: Aug. 8, 2008

(86) PCT No.: PCT/JP2008/064355

§ 371 (c)(1),
(2), (4) Date: Feb. 7, 2011

(87) PCT Pub. No.: WO2010/016144

PCT Pub. Date: Feb. 11, 2010

(65) Prior Publication Data

US 2011/0129139 A1 Jun. 2, 2011

(51) Int. Cl.
*G06K 9/00* (2006.01)

(52) U.S. Cl.
USPC .......................................................... 382/138

(58) Field of Classification Search
USPC ........... 382/135–140; 194/4–7; 209/534–537; 235/379–382; 250/200–205; 356/71–74; 902/7–10
See application file for complete search history.

(56) References Cited

U.S. PATENT DOCUMENTS

| | | | | |
|---|---|---|---|---|
| 5,502,576 A * | 3/1996 | Ramsay et al. | ............... | 358/444 |
| 2003/0059098 A1 | 3/2003 | Jones et al. | | |
| 2003/0168849 A1 | 9/2003 | Reinisch | | |
| 2006/0180515 A1 | 8/2006 | Kimura et al. | ............... | 209/547 |
| 2009/0242627 A1 | 10/2009 | Reinisch et al. | | |

FOREIGN PATENT DOCUMENTS

| | | | | |
|---|---|---|---|---|
| DE | 100 29 051 A1 | 12/2001 | | |
| EP | 1 901 247 A1 | 3/2008 | | |
| JP | 11-328493 | 11/1999 | .............. | G07D 9/00 |
| KR | 2006-0052021 A | 5/2006 | | |
| WO | WO 00/70540 | 11/2000 | | |

OTHER PUBLICATIONS

European Search Report (Application No. 08808875.2 (PCT/JP2008064355) (7 pages—dated Aug. 5, 2012).
Korean Office Action with English Translation (Korean Application No. 2013-7020216) (13 pages—dated Sep. 30, 2013).

* cited by examiner

*Primary Examiner* — Atiba O Fitzpatrick
(74) *Attorney, Agent, or Firm* — Renner, Kenner, Greive, Bobak, Taylor & Weber

(57) ABSTRACT

A paper sheet recognition apparatus, a paper sheet management apparatus, and paper sheet recognition method for performing recognition process for the paper sheets such as banknotes, checks, bills and exchange coupons, wherein image data of the paper sheets are acquired, and identification data that is printed on the paper sheets to identify the paper sheets uniquely are extracted in accordance with the acquired image data, while managing the identification information extracted correspondingly to the registration numbers marked on the paper sheets and the acquired image data, thereby allowing to precisely identify whether or not the paper sheets are judged to be legitimate bills by the paper sheets recognition apparatus.

10 Claims, 10 Drawing Sheets

| SERIAL NUMBER | DENOMINATION | IMAGE DATA | | | FEATURE AMOUNT DATA 1 | FEATURE AMOUNT DATA 2 | ... |
|---|---|---|---|---|---|---|---|
| | | IMAGE 1 | IMAGE 2 | ... | | | |
| DG41500187 | 100 YUAN | #1230 | #2331 | | 156 | 20 | |
| RF45268975 | 20 YUAN | #4050 | #7891 | | 202 | 10 | |
| | | | | | | | |
| | | | | | | | |
| | | | | | | | |

F I G. 3

PAPER SHEET MANAGEMENT SYSTEM, PAPER SHEET RECOGNITION APPARATUS, PAPER SHEET MANAGEMENT APPARATUS, PAPER SHEET MANAGEMENT METHOD AND PAPER SHEET MANAGEMENT PROGRAM

FIELD OF THE INVENTION

The present invention relates to a paper sheet management system including a paper sheet recognition apparatus configured to obtain information on inputted paper sheet, and a paper sheet management apparatus configured to perform management such as registration and search of the information on the paper sheet from the paper sheet recognition apparatus. In particular, the present invention relates to a paper sheet management system, a paper sheet recognition apparatus, a paper sheet management apparatus, a paper sheet management method, and a paper sheet management program, which are capable of, when it is judged whether or not a banknote brought into a store is a banknote that has been dispensed from the store (hereinafter referred to as "dispensed banknote") with the use of a serial number of the banknote, efficiently assuring that the banknote was genuine at a time when the banknote was dispensed from the store.

BACKGROUND ART

An ATM (Automatic Teller Machine) is conventionally installed in a financial institution such as a bank. A customer deposits or takes out cash by inserting a passbook or a cash card. In order to identify a banknote deposited by a customer, it is known that a conventional ATM stores a serial number of an alphanumeric string described on a surface of the banknote, customer information such as an account number of the customer who deposited the banknote, and information such as date and hour when the banknote was deposited by the customer, and manages these data.

For example, in an ATM described in Patent Document 1 (JP11-328493A), by managing a denomination and a serial number of a banknote deposited to the ATM by a customer, and customer information stored in a passbook or a cash card which was inserted by the customer into the ATM simultaneously with the deposit of the banknote, it is possible to identify which customer brought the deposited banknote.

Thus, when a counterfeit note is thereafter found among deposited banknotes, a bank clerk can learn promptly who brought the counterfeit note and place the person on the wanted list, by obtaining information on the person who deposited the counterfeit note from the customer information managed by the ATM based on the serial number of the counterfeit note.

Patent Document 1: JP11-328493A

DISCLOSURE OF THE INVENTION

However, the following case can be considered. Namely, a certain customer brings a banknote which has been dispensed from an ATM or a banknote which might have been counterfeited, into a financial institution and claims "this banknote, which was dispensed from the ATM of the financial institution, seems to be a counterfeit note".

When it is judged whether the banknote brought into the financial institution is a dispensed banknote or not, with the use of a record number of the banknote, and if the banknote is a dispensed banknote, how to assure that the banknote was genuine when it was dispensed from the financial institution is of a great importance. This problem occurs not only with banknotes but also occurs when various kinds of paper sheets such as checks, bills and coupons are handled.

The present invention has been made in order to solve the problem. The object of the present invention is to provide a paper sheet management system, a paper sheet recognition apparatus, a paper sheet management apparatus, a paper sheet management method, and a paper sheet management program, which are capable of, when it is judged whether a banknote brought into a financial institution is a dispensed banknote or not, with the use of a serial number of the banknote, and if the banknote is a dispensed banknote, efficiently assuring that the banknote was genuine at the time when the banknote was dispensed from the financial institution.

In order to solve the problem and achieve the object, a paper sheet management system according to claim 1 is a paper sheet management system including a paper sheet recognition apparatus configured to obtain inputted information on a paper sheet, and a paper sheet management apparatus configured to perform management such as registration and search of the information on the paper sheet transmitted from the paper sheet recognition apparatus, wherein the paper sheet management system includes: a recognition-information extracting unit configured to extract recognition information printed on the paper sheet, the recognition information uniquely identifying the paper sheet; a recognition-information storage unit configured to store the recognition information extracted by the recognition-information extracting unit; and a recognition-information searching unit configured to search predetermined recognition information in the recognition-information storage unit, and to output existence or nonexistence of the recognition information in the recognition-information storage unit.

In addition, a paper sheet management system according to claim 2 further includes a paper-sheet information obtaining unit configured to obtain paper sheet information of the paper sheet; a paper-information storage unit configured to store the recognition information extracted by the recognition-information extracting unit and the paper sheet information obtained by the paper-sheet information obtaining unit, such that the recognition information and the paper sheet information are related to each other; and a paper-sheet information searching unit configured to search predetermined recognition information in the paper-sheet information storage unit, and to output existence or nonexistence of the recognition information in the paper-sheet information storage unit and paper sheet information corresponding to the recognition information.

In addition, in a paper sheet management system according to claim 3, the recognition-information extracting unit includes an imaging unit configured to image an image of the paper sheet, a partial-image extracting unit configured to extract a partial image of a predetermined area of the image imaged by the imaging unit, and a character recognizing unit configured to recognize, as a character, data in the partial image extracted by the partial-image extracting unit, and the imaging unit and the partial-image extracting unit are provided in the paper sheet recognition apparatus, and the character recognizing unit is provided in the paper sheet management apparatus.

In addition, in a paper sheet management system according to claim 4, the recognition-information storage unit and the recognition-information searching unit are provided in the paper sheet management apparatus.

In addition, in a paper sheet management system according to claim 5, the paper-sheet information obtaining unit is configured to obtain, as the paper sheet information, image data of the paper sheet or feature amount data showing features of the paper sheet.

In addition, in a paper sheet management system according to claim 6, the paper sheet management apparatus further includes an input receiving unit configured to receive an input of recognition information of a paper sheet to be searched, and a displaying and controlling unit configured to control a predetermined display unit such that image data corresponding to the recognition information searched by the paper-sheet information searching unit are displayed on the display unit.

In addition, in a paper sheet management system according to claim 7, the paper sheet management apparatus further includes a data receiving unit configured to receive the recognition information and the paper sheet information of the paper sheet to be searched from the paper sheet recognition apparatus, a similarity calculating unit configured to calculate a degree of similarity between the paper sheet information received by the data receiving unit and paper sheet information corresponding to the recognition information searched by the paper-sheet information searching unit, and a displaying and controlling unit configured to control a predetermined display unit such that the degree of similarity calculated by the similarity calculating unit on the display unit.

In addition, in a paper sheet management system according to claim 8, the paper sheet management apparatus further includes a displaying and controlling unit configured to control the display unit such that image data corresponding to the recognition information searched by the paper-sheet information searching unit, and image data corresponding to the paper sheet information received by the data receiving unit, are displayed on the display unit.

In addition, a paper sheet management apparatus according to claim 9 is a paper sheet management apparatus configured to obtain inputted information on a paper sheet, and to perform management such as registration and search of the information on the paper sheet, the paper sheet management apparatus including: a recognition-information extracting unit configured to extract recognition information printed on the paper sheet, the recognition information uniquely identifying the paper sheet; a recognition-information storage unit configured to store the recognition information extracted by the recognition-information extracting unit; and a recognition-information searching unit configured to search predetermined recognition information in the recognition-information storage unit, and to output existence or nonexistence of the recognition information in the recognition-information storage unit.

In addition, a paper sheet management method according to claim 10 is a paper sheet management method for obtaining inputted information on a paper sheet, and for performing management such as registration and search of the information on the paper sheet, the paper sheet management method including the steps of: extracting recognition information printed on the paper sheet, the recognition information uniquely identifying the paper sheet; registering, in a storage unit, the recognition information extracted by the extracting of the recognition information; and searching a predetermined recognition information in the storage unit, and outputting existence or nonexistence of the recognition information in the storage unit.

In addition, a paper sheet management program according to claim 11 is a paper sheet management program for obtaining inputted information on a paper sheet, and performing management such as registration and search of the information on the paper sheet, the paper sheet management program being executable by a computer to perform the procedures of: extracting recognition information printed on the paper sheet, the recognition information uniquely identifying the paper sheet; registering, in a storage unit, the recognition information extracted by the extracting of the recognition information; and searching a predetermined recognition information in the storage unit, and outputting existence or nonexistence of the recognition information in the storage unit.

According to the present invention, a paper sheet management system includes a paper sheet recognition apparatus configured to obtain inputted information on a paper sheet, and a paper sheet management apparatus configured to perform management such as registration and search of the information on the paper sheet transmitted from the paper sheet recognition apparatus, wherein the paper sheet management system includes: a recognition-information extracting unit configured to extract recognition information printed on the paper sheet, the recognition information uniquely identifying the paper sheet; a recognition-information storage unit configured to store the recognition information extracted by the recognition-information extracting unit; and a recognition-information searching unit configured to search predetermined recognition information in the recognition-information storage unit, and to output existence or nonexistence of the recognition information in the recognition-information storage unit. Thus, a user (clerk of a bank) can search the recognition information, such as a serial number of a banknote brought into a store. Based on the search result of the serial number, the user can recognize whether the banknote is a dispensed banknote or not.

In addition, according to the present invention, the paper sheet management system further includes: a paper-sheet information obtaining unit configured to obtain paper sheet information of the paper sheet; a paper-information storage unit configured to store the recognition information extracted by the recognition-information extracting unit and the paper sheet information obtained by the paper-sheet information obtaining unit, such that the recognition information and the paper sheet information are related to each other; and a paper-sheet information searching unit configured to search predetermined recognition information in the paper-sheet information storage unit, and to output existence or nonexistence of the recognition information in the paper-sheet information storage unit and paper sheet information corresponding to the recognition information. Thus, when a banknote brought into a store is judged whether the banknote is a dispensed banknote or not with the use of a serial number of the banknote, the fact that a banknote was genuine at a time when the banknote was dispensed from the store can be efficiently assured.

In addition, according to the present invention, the recognition-information extracting unit includes an imaging unit configured to photograph an image of the paper sheet, a partial-image extracting unit configured to extract a partial image of a predetermined area of the image photographed by the imaging unit, and a character recognizing unit configured to recognize, as a character, data in the partial image extracted by the partial-image extracting unit, and the imaging unit and the partial-image extracting unit are provided in the paper sheet recognition apparatus, and the character recognizing unit is provided in the paper sheet management apparatus. Thus, a load of the process in the paper sheet recognition apparatus can be reduced.

In addition, according to the present invention, the recognition-information storage unit and the recognition-information searching unit are provided in the paper sheet management apparatus. Thus, a load of the process in the paper sheet recognition apparatus can be reduced.

In addition, according to the present invention, the paper-sheet information obtaining unit is configured to obtain, as the paper sheet information, image data of the paper sheet or feature amount data showing features of the paper sheet. Thus, when a banknote brought into a store is judged whether the banknote is a dispensed banknote or not with the use of a serial number of the banknote, the banknotes can be checked by using the image data and the feature amount data of the banknotes. Therefore, the fact that a banknote was genuine at a time when the banknote was dispensed from the store can be efficiently assured.

In addition, according to the present invention, the paper sheet management apparatus further includes an input receiving unit configured to receive an input of recognition information of a paper sheet to be searched, and a displaying and controlling unit configured to control a predetermined display unit such that image data corresponding to the recognition information searched by the paper-sheet information searching unit are displayed on the display unit. Thus, banknotes can be checked only by inputting the recognition information. Therefore, when a banknote brought into a store is judged whether the banknote is a dispensed banknote or not with the use of a serial number of the banknote, the fact that a banknote was genuine at a time when the banknote was dispensed from the store can be efficiently assured.

In addition, according to the present invention, the paper sheet management apparatus further includes a data receiving unit configured to receive the recognition information and the paper sheet information of the paper sheet to be searched from the paper sheet recognition apparatus, a similarity calculating unit configured to calculate a degree of similarity between the paper sheet information received by the data receiving unit and paper sheet information corresponding to the recognition information searched by the paper-sheet information searching unit, and a displaying and controlling unit configured to control a predetermined display unit such that the degree of similarity calculated by the similarity calculating unit on the display unit. Thus, banknotes can be easily judged by using the similarity. Therefore, when a banknote brought into a store is judged whether the banknote is a dispensed banknote or not with the use of a serial number of the banknote, the fact that a banknote was genuine at a time when the banknote was dispensed from the store can be efficiently assured.

In addition, according to the present invention, the paper sheet management apparatus further includes a displaying and controlling unit configured to control the display unit such that image data corresponding to the recognition information searched by the paper-sheet information searching unit, and image data corresponding to the paper sheet information received by the data receiving unit, are displayed on the display unit. Thus, since image data of two banknotes can be compared to each other by visual observation, the checking operation of the banknotes is facilitated. Therefore, when a banknote brought into a store is judged whether the banknote is a dispensed banknote or not with the use of a serial number of the banknote, the fact that a banknote was genuine at a time when the banknote was dispensed from the store can be efficiently assured.

In addition, according to the present invention, a paper sheet management apparatus configured to obtain inputted information on a paper sheet, and to perform management such as registration and search of the information on the paper sheet, the paper sheet management apparatus includes: a recognition-information extracting unit configured to extract recognition information printed on the paper sheet, the recognition information uniquely identifying the paper sheet; a recognition-information storage unit configured to store the recognition information extracted by the recognition-information extracting unit; and a recognition-information searching unit configured to search predetermined recognition information in the recognition-information storage unit, and to output existence or nonexistence of the recognition information in the recognition-information storage unit. Thus, a user can search a serial number of a banknote brought into a store in the paper sheet management apparatus. Based on the search result of the serial number, the user can recognize whether the banknote is a dispensed banknote or not.

In addition, according to the present invention, a paper sheet management method for obtaining inputted information on a paper sheet, and for performing management such as registration and search of the information on the paper sheet, the paper sheet management method includes the steps of: extracting recognition information printed on the paper sheet, the recognition information uniquely identifying the paper sheet; registering, in a storage unit, the recognition information extracted by the extracting of the recognition information; and searching a predetermined recognition information in the storage unit, and outputting existence or nonexistence of the recognition information in the storage unit. Thus, a user can search a serial number of a banknote brought into a store. Based on the search result of the serial number, the user can recognize whether the banknote is a dispensed banknote or not.

In addition, according to the present invention, a paper sheet management program for obtaining inputted information on a paper sheet, and performing management such as registration and search of the information on the paper sheet, the paper sheet management program is executable by a computer to perform the procedures of: extracting recognition information printed on the paper sheet, the recognition information uniquely identifying the paper sheet; registering, in a storage unit, the recognition information extracted by the extracting of the recognition information; and searching a predetermined recognition information in the storage unit, and outputting existence or nonexistence of the recognition information in the storage unit. Thus, when a banknote brought into a store is judged whether the banknote is a dispensed banknote or not with the use of a serial number of the banknote, a user can search a serial number of the banknote brought into a store. Based on the search result of the serial number, the user can recognize whether the banknote is a dispensed banknote or not.

BRIEF DESCRIPTION OF THE DRAWINGS

FIG. 3 is an explanatory view showing a banknote information table according to the embodiment 1.

Figure 1:
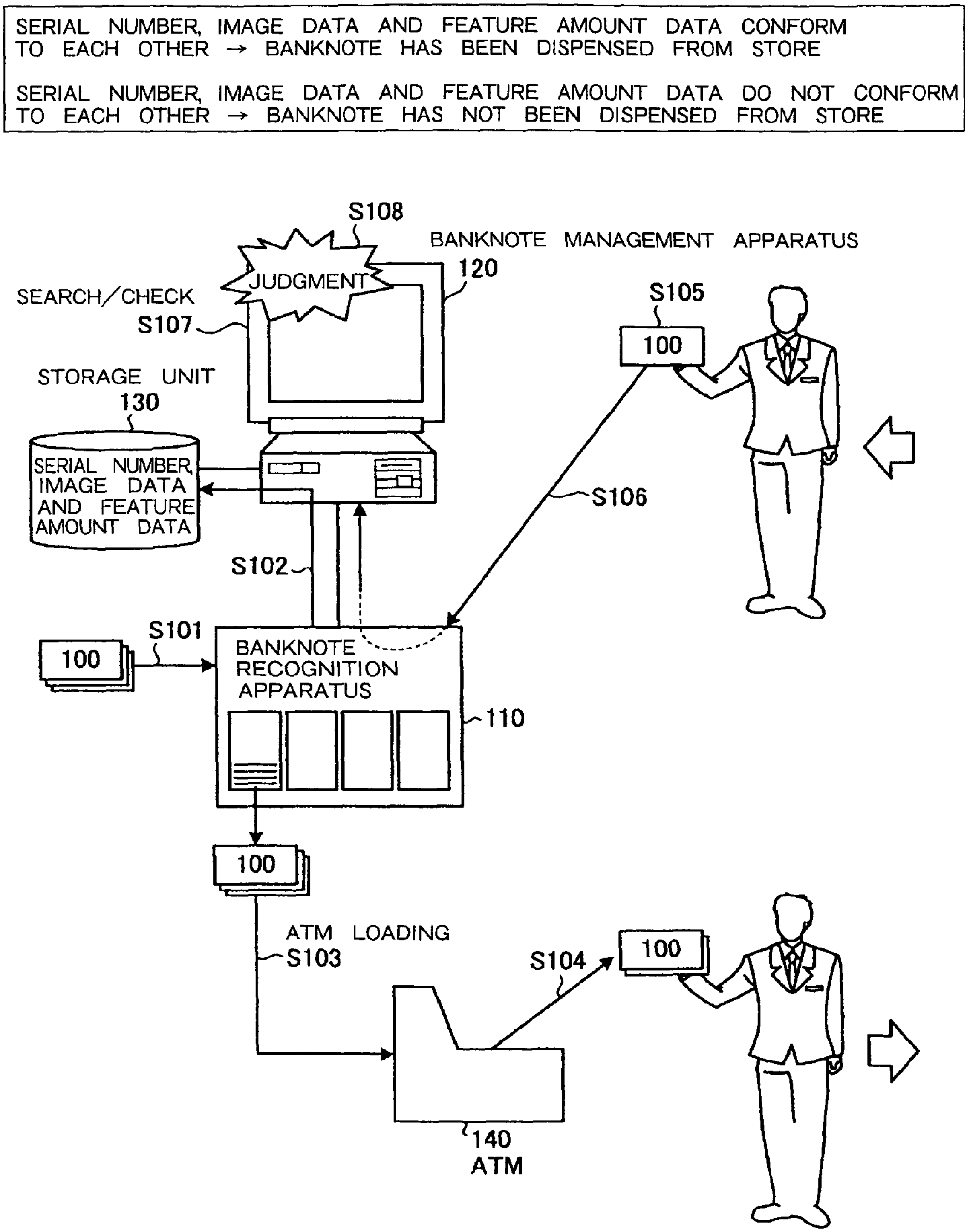
FIG. 1 is an explanatory view schematically showing a paper sheet management system according to an embodiment 1.

110 banknote recognition apparatus
120 banknote management apparatus
130 storage unit
140 ATM (Automatic Teller Machine)
211 imaging unit
212 banknote handling mechanism
213 storage unit
214 recognition control unit
214*a* image processing unit
214*b* feature-amount-data calculating unit
214*c* serial number extracting unit
214*d* banknote-information transmit processing unit
221 input unit
222 display unit
223*a* database
224 management control unit
224*a* database management unit
224*b* search processing unit
224*c* display processing unit
224*d* check processing unit
310 readout banknote image
311 database banknote image
312 similarity display unit
410 database banknote image
411 list of search result of serial number
412 list of search result of image type
413 display button
510 banknote recognition apparatus
511 imaging unit
512 banknote handling mechanism
513 storage unit
514 recognition control unit
514*a* imaging unit
514*b* feature-amount-data calculating unit
514*c* serial number extracting unit
514*d* banknote-information transmitting unit
520 banknote management apparatus
521 input unit
522 display unit
523 storage unit
523*a* database
523*b* counterfeit-note database
524 management control unit
524*a* database management unit
524*b* search processing unit
524*c* display processing unit
524*d* check processing unit

BEST MODE FOR CARRYING OUT THE INVENTION

Embodiments of the present invention will be concretely described with reference to the accompanying drawings. Given herein as an example to describe the present invention is a case where the present invention is applied to a paper sheet management system configured to handle paper sheets. However, the present invention can be applied to a paper sheet management system configured to handle other given paper sheets, such as checks, bills and coupons.

Embodiment 1

At first, an embodiment 1 of the paper sheet management system according to the present invention is described. The paper sheet management system in this embodiment is a system that is installed in a bank of a financial institution such as a bank. The paper sheet management system is capable of efficiently assuring that, at a time when a banknote is dispensed from the bank, the banknote is genuine. Thus, when a customer brings a banknote into the bank, the paper sheet management system is capable of demonstrating whether the banknote is a banknote that has been dispensed from the bank or not.

As shown in FIG. 1, the paper sheet management system is composed of a banknote recognition apparatus 110 and a banknote management apparatus 120. The banknote recognition apparatus 110 is configured to obtain data on banknotes that have been put thereinto by a bank clerk (hereinafter referred to simply as "clerk"). The banknote management apparatus 120 is configured to perform various information processing processes such as registration, management and search of data on the respective banknotes obtained by the banknote recognition apparatus 110.

The banknote recognition apparatus 110 has a function for judging authenticity and fitness of the respective banknotes to be dispensed which have been deposited by the clerk, then sorting the banknotes by denomination, and putting the banknotes into storing units for each denomination. The banknotes recognized by the banknote recognition apparatus 110 are loaded into an ATM (Automatic Teller Machine) 140, which is shown on a lower side of FIG. 1, by the clerk. Thereafter, the banknotes are drawn by a customer from the ATM 140 so as to be dispensed from the store.

Specifically, when banknotes to be dispensed are put into the banknote recognition apparatus 110, the banknote recognition apparatus 110 in the embodiment 1 is configured to image the respective banknotes so as to obtain image data or figure data. The figure data are, for example, numerical light received results such as reflectance and transmittance obtained when infrared light is irradiated onto the respective banknotes. The banknote recognition apparatus 110 is configured to extract, from the obtained image data, an area on which a serial number is printed, the serial number being peculiar to each banknote whereby a banknote can be uniquely identified. Further, the banknote recognition apparatus 110 is configured to obtain banknote feature amount data which differ from one banknote to another banknote, from the respective image data or the figure data.

In addition, the banknote recognition apparatus 110 is configured to output, to the banknote management apparatus 120, partial image data of the areas on which the serial numbers of the respective banknotes are printed, and the image data as well as the feature amount data of the banknotes corresponding to the respective serial numbers, in a manner such that the partial image data, the image data and the feature amount data are related to each other.

The banknote management apparatus 120 includes a storage unit 130 configured to extract the serial numbers from the partial image data of the areas on which the serial numbers of the respective banknotes are printed, which have been received from the banknote recognition apparatus 110, and to store the extracted serial numbers, and the image data as well as the feature amount data of the banknotes corresponding to the respective serial numbers, in a manner such that the record numbers, the image data and the feature amount data are related to each other. For each time when banknotes to be dispensed are put into the banknote recognition apparatus 110, the banknote management apparatus 120 is configured to cause the storage unit 130 to store the serial numbers, the image data and the feature amount data of each banknote inputted from the banknote recognition apparatus 110, so as to perform a database management such as registration, deletion and search of the various data.

In addition, the banknote management apparatus 120 is configured to search a serial number of a banknote in the storage unit 130, and to output data showing whether the serial number used in the search is stored or not in the storage unit 130. Further, when the serial number used in the search is stored in the storage unit 130, the banknote management apparatus 120 is configured to output the image data of the banknote and the feature amount data of the banknote, which are stored in the storage unit 130 correspondingly to the serial number.

In this manner, in the paper sheet management system in the embodiment 1, respective banknotes, which are prepared for dispensing, are imaged before dispensed. Then, from the thus obtained image data of the respective banknotes, the serial numbers peculiar to the respective banknotes printed thereon are extracted. Further, the feature amount data peculiar to the respective banknotes are obtained from the image data or the figure data of the respective imaged banknotes, and the serial numbers, the image data and the feature amount data are stored in a manner such that the data are related to the respective banknotes.

Furthermore, the paper sheet management system is configured to be capable of searching, with the use of serial numbers of banknotes, the serial numbers, the image data and the feature amount data relating to the respective banknotes, which have been previously stored before the banknotes are dispensed, and of outputting the search result.

Thus, in a bank where the paper sheet management system is installed, in a case where a customer brings a banknote to the bank and claims "the banknote which has been dispensed from the ATM 140 of the bank is a counterfeit note", the paper sheet management system can, with the use of the serial number of the banknote brought into the bank, search the data on the banknote which has been previously stored before the banknote is dispensed from the bank. By outputting the search result to show to the customer who brought the banknote, the paper sheet management system can demonstrate whether the banknote brought by the customer is a banknote that has been dispensed from the ATM 140 of the bank or not.

In particular, the paper sheet management system does not merely check the serial number of the money brought by the customer with the previously stored serial numbers of the banknotes before dispensed, but judges the validity of the banknote brought by the customer (the fact that the banknote has truly been dispensed from the bank where the system is installed) by using, in addition to the serial numbers, the image data and the banknote feature amount data of the banknotes, which have been obtained before respective banknotes are dispensed. Thus, the judgment of the validity can be made with more strict accuracy, and the trusting relationship between the bank and the customer can be improved As long as a banknote is a genuine note, a serial number printed on the banknote is a parameter sufficient for uniquely identifying the banknote. However, when the banknote is a counterfeit note, there is a possibility that the same serial number as that of the genuine note might be printed on the counterfeit note. In this case, the serial number is a parameter insufficient for uniquely identifying the banknote.

On the other hand, on the assumption that the banknote before dispensed is a genuine banknote, the image data or the figure data of a banknote that has been imaged, and the feature amount data obtained from the image data or the figure data, are more difficult to be imitated or counterfeited as compared with the serial number. Thus, they can be parameters sufficient for uniquely identifying the banknote.

This is because a banknote varies across the ages. Namely, across the ages, the banknote has fold lines, stains and minute wrinkles on the surface, and a color thereof is fade out in the course of circulation. These features of the banknote across the ages can be used as information peculiar to the banknote, and thus can be a parameter sufficient for uniquely identifying the banknote.

In this manner, in the paper sheet management system in the embodiment 1, the serial numbers of banknotes, and the feature amount data of the respective banknotes which are difficult to be counterfeited, are previously stored before the banknotes are dispensed, in a manner such that the serial numbers and the feature amount data are related to each other. When a customer brings a banknote, the paper sheet management system can search the same serial number as the serial number of the banknote, and check the image data and the feature amount data corresponding to the correspondent serial number with the banknote brought by the customer. Thus, the paper sheet management system can strictly and fairly judge the validity of the banknote brought by the customer, and clearly show the judgment result to the customer.

A banknote management method by the paper sheet management system in the embodiment 1 is described with reference again to FIG. 1. Herein, there is described a flow including a series of steps, i.e., a step in which a clerk puts banknotes to be dispensed to the banknote recognition apparatus 110, a step in which the banknotes are dispensed by a customer, and a step in which a validity of a banknote brought by a customer is judged thereafter.

As shown in FIG. 1, in a bank where the paper sheet management system is installed, a clerk inputs banknotes to be dispensed into the banknote recognition apparatus 110 (step S101). When the banknotes to be dispensed are put thereinto, the banknote recognition apparatus 110 judges authenticity and fitness of the banknotes. Then, the banknote recognition apparatus 110 images the respective banknotes to obtain image data or figure data of the respective banknotes, and cuts out areas on which serial numbers are printed from the obtained image data so as to obtain partial image data.

Further, the banknote recognition apparatus 110 performs a process by which feature amount data of the respective photographed banknotes are obtained from the image data or the figure data of the banknotes. As long as the process for obtaining the feature amount data is an image processing capable of extracting features of the respective banknotes such as difference in colors and/or fold lines of the banknotes, any process can be employed. For example, it is possible to employ a process that divides the image into a plurality of minute areas to obtain brightness values of the respective areas, and extracts colors and/or shading of fold lines of the respective banknotes from the brightness values so as to obtain feature amount data.

The banknote recognition apparatus 110 outputs the partial image data of the areas on which the serial numbers of the respective banknotes are printed, and the image data as well as the feature amount data of the banknotes corresponding to the respective serial numbers, to the banknote management apparatus 120, in a manner such that the serial numbers, the image data and the feature amount data are related to each other (step S102).

When the partial image data of the areas on which the serial numbers of the respective banknotes are printed are inputted from the banknote recognition apparatus 110, the banknote management apparatus 120 performs a process by which the partial image data are recognized as characters so that the serial numbers of the respective banknotes can be read.

Thereafter, the storage unit 130 stores the serial numbers of the respective banknotes, and the image data as well as the feature amount data of the banknotes corresponding to the respective serial numbers, in a manner such that the serial numbers, the image data and the feature amount data are related to the respective banknotes. Thus, the data on the banknotes to be dispensed are registered and managed.

In the embodiment 1, the banknote recognition apparatus 110 outputs, to the banknote management apparatus 120, the partial image data of the areas on which the serial numbers are printed, the image data and the feature amount data. However, the banknote recognition apparatus 110 may output, to the banknote management apparatus 120, the partial image data of the areas on which the serial numbers of the banknotes are printed, and one of the image data of the banknotes corresponding to the serial numbers and the feature amount data of the banknotes corresponding to the serial numbers.

The banknotes whose authenticity and fitness have been judged by the banknote recognition apparatus 110 are sorted by denomination, and stored in the storing units for each denomination in the banknote recognition apparatus 110. Thereafter, the banknotes are loaded into the ATM 140 (step S103). The banknote loaded into the ATM 140 are dispensed from the ATM, i.e., from the bank by a dispense operation of the ATM 140 by a customer (step S104).

After that, when a certain customer brings a banknote into the bank, and claims "the banknote that has been dispensed from the ATM 140 of this bank branch is a counterfeit note" (step S105), the paper sheet management system judges whether the banknote brought by the customer is a banknote that has been dispensed from the store or not, with the use of the various data stored in the storage unit 130 of the banknote management apparatus 120. Then, the result is shown to the customer.

Namely, when a customer brings a banknote into the bank and claims as described above, a clerk firstly puts the banknote brought by the customer to the banknote recognition apparatus 110 (step S106). The banknote recognition apparatus 110 images the banknote put by the clerk to obtain image data or figure data. The banknote recognition apparatus 110 reads the serial number of the banknote from the image data or the figure data, and generates feature amount data of the banknote from the image data or the figure data. Then, the banknote recognition apparatus 110 transmits the data showing the serial number of the banknote, the image data and the feature amount data to the banknote management apparatus 120.

When the banknote management apparatus 120 receives the data showing the serial number of the banknote, the image data and the feature amount data, which have been transmitted from the banknote recognition apparatus 110, the banknote management apparatus 120 judges whether data showing the same serial number as the serial number of the received data are stored (registered) in the storage unit 130 or not. That is to say, the banknote management apparatus 120 searches, in the storage unit 130, the serial number of the banknote brought by the customer so as to judge whether such a serial number exists or not.

When the banknote management apparatus 120 judges that data showing the same serial number as the serial number of the banknote brought by the customer is registered in the storage unit 130, the banknote management apparatus 120 reads the image data and the feature amount data of the banknote corresponding to the serial number from the storage unit 130. Then, the banknote management apparatus 120 checks the image data and the feature amount data with the image data and the feature amount data of the banknote which have been received from the banknote recognition apparatus 110 (step S107).

Thereafter, the banknote management apparatus 120 outputs, to a display unit, the search result of the serial number of the banknote brought by the customer, the image of the banknote brought by the customer, the image of the banknote which has been generated from the image data read out from the storage unit 130, and the judgment result judging the similarity of these two images, and causes the display unit to display the same (step S108).

On the other hand, when the banknote management apparatus 120 judges that data showing the same serial number as the serial number of the banknote brought by the customer is not registered in the storage unit 130, the banknote management apparatus 120 outputs the search result to the display unit, and causes the display unit to display the result (step S108).

Thus, when the images of the two banknotes are displayed on the display unit, the clerk can judge the identity of the two banknotes not only by the visual observation but also by the degree of similarity calculated by the image data of the two images, whereby the identity of the two banknotes can be more reliably judged.

Thus, from the search result of the serial number by the banknote management apparatus 120, the clerk can see that the serial number of the banknote brought by the customer is registered in the storage unit 130 of the banknote management apparatus 120. In addition, from the judgment result of the identity by the visual observation and the degree of similarity, the clerk can judge that the images of the two banknotes are identical to each other. In this case, based on the search result and the judgment result, the clerk can demonstrate to the customer that the banknote brought by the customer is a banknote that has been dispensed from the bank, and that the banknote is not a counterfeit banknote.

On the other hand, from the search result of the serial number by the banknote management apparatus 120, the clerk can see that the serial number of the banknote brought by the customer is registered in the storage unit 130 of the banknote management apparatus 120. In addition, from the judgment result of the identity by the visual observation and the degree of similarity, the clerk can judge that the images of the two banknotes are not identical to each other. In this case, based on the search result and the judgment result, the clerk can demonstrate to the customer that the banknote brought by the customer is not a banknote that has been dispensed from the store, and that the banknote is a counterfeit banknote.

Further, from the search result of the serial number by the banknote management apparatus 120, when the serial number of the banknote brought by the customer is not registered in the storage unit 130 of the banknote management apparatus 120, the clerk can demonstrate to the customer that the banknote brought by the customer is not a banknote that has been dispensed from the store, based on the search result.

Furthermore, when the clerk visually observes the banknote brought by the customer and can judge that there is extremely a strong suspicion that the banknote is a counterfeit note, the paper sheet management system in the embodiment

1 is configured to demonstrate to the customer the validity of the judgment of the clerk by a method different from the aforementioned method.

In this case, the clerk inputs the serial number of the banknote brought by the customer directly to the banknote management apparatus 120. When the serial number is inputted by the clerk, the banknote management apparatus 120 searches the serial number in the storage unit 130, and judges whether data showing the same serial number as the serial number inputted by the clerk are registered or not.

Then, the banknote management apparatus 120 outputs the search result of the serial number, and causes the display unit to display the result. From the search result of the serial number, when it is judged that data showing the same serial number as the serial number inputted by the clerk are registered, the banknote management apparatus 120 outputs an image of the banknote, which is generated from the image data stored correspondingly to the serial number, and causes the display unit to display the image.

Thus, from the search result of the serial number, when it is judged that the same serial number as the serial number inputted by the clerk is not registered in the storage unit 130, the clerk can demonstrate to the customer that the banknote brought by the customer is not a banknote that has been dispensed from the store, based on the search result.

On the other hand, from the search result of the serial number, when it is judged that the serial number of the banknote brought by the customer is registered in the storage unit 130 of the banknote management apparatus 120, the clerk can judge the image of the banknote displayed on the banknote management apparatus 120 is not identical to the banknote brought by the customer, by the visual observation.

Namely, the clerk visually compares the image of the banknote displayed on the display unit of the banknote management apparatus 120, with the banknote brought by the customer. Then, in a case where, although the same serial number is printed on the banknotes, a feature which inevitably appears on the front surface or the rear surface of the banknote as long as the banknote is a genuine banknote having the serial number, and a feature visually observed from the banknote brought by the customer, clearly differ from each other, the clerk can judge that the banknote brought by the customer is a counterfeit note.

Thus, based on the image of the banknote displayed on the display unit of the banknote management apparatus 120, the clerk can demonstrate to the customer that the banknote brought by the customer is not a banknote that has been dispensed from the bank, and that the banknote is a counterfeit note.

Figure 2:
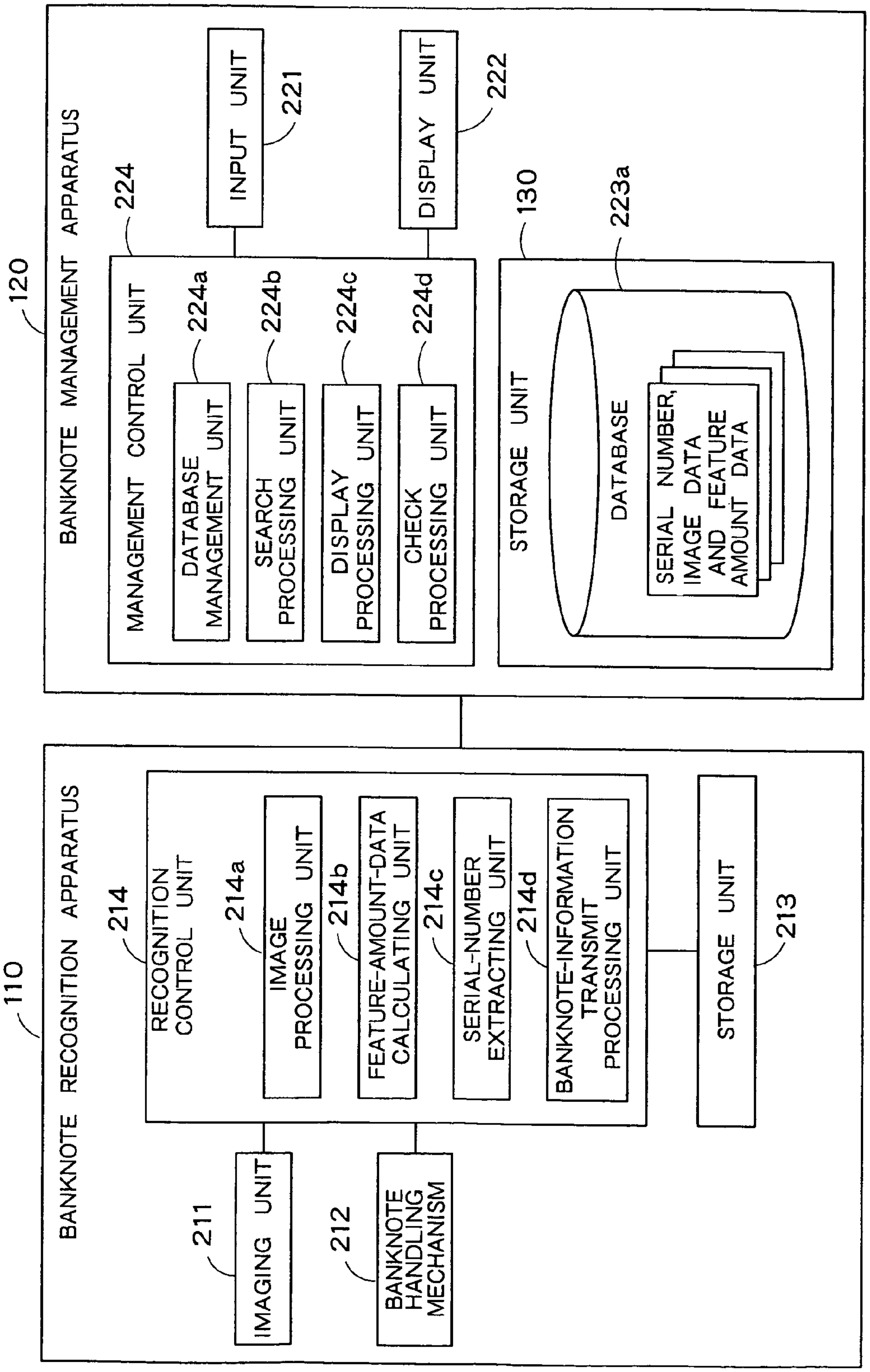
FIG. 2 is a functional block view showing structures of a banknote recognition apparatus and a banknote management apparatus according to the embodiment 1.

Next, the structures of the banknote recognition apparatus 110 and the banknote management apparatus 120 constituting the above-described paper sheet management system are described with reference to FIG. 2. FIG. 2 is a functional block view showing the structures of the banknote recognition apparatus 110 and the banknote management apparatus 120 in the embodiment 1.

At first, the structure of the banknote recognition apparatus 110 in the embodiment 1 is described. As shown in FIG. 2, the banknote recognition apparatus 110 in the embodiment 1 is composed of an imaging unit 211, a banknote handling mechanism 212, a storage unit 213, and a recognition control unit 214.

The imaging unit 211 includes a CCD (Charge Coupled Device) camera, and a light irradiating unit that irradiates plural kinds of light, such as visible light, infrared light and green light, onto a subject of the CCD camera. The imaging unit 211 sequentially irradiates the plural kinds of lights onto a banknote as a subject. The CCD camera receives reflected light reflected on the banknote, so that images of respective banknotes to be dispensed which have been put to the banknote recognition apparatus 110, and an image of a banknote brought by a customer which has been put thereinto, can be imaged by the imaging unit 211. Then, the imaging unit 211 outputs, to the recognition control unit 214, plural kinds of image data obtained for the respective images. In addition, the imaging unit 211 images a front surface and a rear surface of each banknote, and outputs the image data for each surface of the banknote to the recognition control unit 214.

Moreover, the imaging unit 211 is configured to irradiate predetermined light onto a banknote, and the CCD camera receives the light having transmitted through the banknote. The imaging unit 211 is configured to output thus obtained image data to the recognition control unit 214.

Further, the imaging unit 211 has a magnetic sensor that detects a magnetic distribution on front surfaces and rear surfaces of banknotes to be dispensed which has been put into the banknote recognition apparatus 110, and a magnetic distribution on a front surface and a rear surface of a banknote brought by a customer which has been put thereinto. The imaging unit 211 also outputs image data showing the magnetic distribution of each banknote, which is detected by the magnetic sensor, to the recognition control unit 214. In the embodiment 1, the imaging unit 211 serves as a imaging unit that images an image of a paper sheet.

The banknote handling mechanism 212 is formed of a transport mechanism that transports banknotes put into the banknote recognition apparatus 110 to the imaging unit 211, the storing units of banknotes and a return slot for banknotes, from an inlet for banknotes.

The storage unit 213 is formed of an nonvolatile information storage member such as a flash memory, and temporarily stores various data required for the processes performed by the recognition control unit 214.

The recognition control unit 214 is formed of a microcomputer having a CPU (Central Processing Unit), a ROM (Read-Only Memory) and a RAM (Random Access Memory). The ROM stores various programs to be performed to totally control the operation of the banknote recognition apparatus 110 as a whole. The RAM is a temporary memory unit that functions as a working area when the various programs stored in the ROM are performed by the CPU.

The recognition control unit 214 serves as an image processing unit 214*a*, a feature-amount-data calculating unit 214*b*, a serial number extracting unit 214*c*, and a banknote-information transmit processing unit 214*d*, when the CPU reads various programs stored in the ROM and executes the same. The image processing unit 214*a* performs a predetermined image processing to various image data inputted from the imaging unit 211. The feature-amount-data calculating unit 214*b* calculates feature amount data peculiar to each banknote from image data or figure data so as to generate feature amount data of each banknote. The serial number extracting unit 214*c* cuts out a predetermined area from an image of a banknote, on which a serial number is described. The banknote information transmit processing unit 214*d* transmits image data and feature amount data of banknotes to the banknote management apparatus 120.

Namely, in the embodiment 1, the imaging unit 211 serves as the imaging unit that images an image of a paper sheet, the feature-amount-data calculating unit 214*b* serves as a paper-sheet information obtaining unit that obtains paper sheet information such as image data and feature amount data of banknotes, and the serial number extracting unit 214*c* serves as a partial-image extracting unit that extracts a partial image of a predetermined area of an image imaged by the imaging unit. In the embodiment 1, the banknote recognition apparatus 110 corresponds to a paper sheet recognition apparatus that obtains information on inputted paper sheets.

Next, the structure of the banknote management apparatus 120 in the embodiment 1 is described. The banknote management apparatus 120 is connected to the above banknote recognition apparatus 110 through a communication line, so that the banknote management apparatus 120 can receive various data transmitted from the banknote recognition apparatus 110.

As shown in FIG. 2, the banknote management apparatus 120 is composed of an input unit 221, a display unit 222, the storage unit 130, and a management control unit 224.

The input unit 221 is formed of an input device such as a keyboard or a mouse, and is operated by a clerk when the clerk inputs various data such as a serial number of a banknote brought by a customer. In the embodiment 1, the input unit 221 serves as an input receiving unit that receives an input of recognition information of a paper sheet to be searched.

The display unit 222 is formed of a display device such as a liquid crystal display, and displays various images based on a display control of the management control unit 224.

The storage unit 130 is formed of an information storage member such as a flash memory or a HDD (Hard Disk Drive), and stores various data inputted from the banknote recognition apparatus 110. In particular, in the embodiment 1, the storage unit 130 stores image data relating to a serial number imaged by the banknote recognition apparatus 110, image data of a whole banknote, and feature amount data, in a manner such that these data are related to each banknote. In the embodiment 1, the storage unit 130 serves as a paper-sheet information storage unit that stores recognition information and paper sheet information received from the paper sheet recognition apparatus in a manner such that the recognition information and the paper sheet information are related to each other. Herebelow, the data group relating to banknotes stored in the storage unit 130 is referred to as "database 223*a*".

The management control unit 224 is formed of a microcomputer having a CPU (Central Processing Unit), a ROM (Read-Only Memory) and a RAM (Random Access Memory). The ROM stores various programs to be performed to totally control the operation of the banknote management apparatus 120 as a whole. The RAM is a temporary memory unit that functions as a working area when the various programs stored in the ROM are performed by the CPU.

The management control unit 224 serves as a database management unit 224*a*, a search processing unit 224*b*, a display processing unit 224*c*, and a check processing unit 224*d*, when the CPU reads various data stored in the ROM and executes the same. The database management unit 224*a* manages the database 223*a* in the storage unit 130. The search processing unit 224*b* searches predetermined data from the database 223*a* based on a serial number of a banknote inputted from the input unit 221 or the banknote recognition apparatus 110. The display processing unit 224*c* controls display of the display unit 222. The check processing unit 224*d* checks various data on a banknote brought by a customer with data in the database 223*a*.

Namely, in the embodiment 1, when partial image data cut out by the partial-image extracting unit is inputted from the banknote recognition apparatus 110, the control management unit 224 serves as a character recognition unit that recognizes the data in the cut-out area as characters, a data receiving unit that receives, from the paper sheet recognition apparatus 110, recognition information and paper sheet information of a paper sheet to be searched, and an input receiving unit that receives an input of recognition information of a paper sheet to be searched, which is inputted from the input unit 221.

The storage unit 130 serves as a paper-sheet information storage unit that stores recognition information of a paper sheet and paper sheet information inputted from the paper sheet recognition apparatus 110, in a manner such that the recognition information and the paper sheet information are related to each other. The search processing unit 224*b* serves as a paper-sheet information searching unit that searches recognition information inputted by the input receiving unit in the paper-sheet information storage unit, and outputs existence or nonexistence of the recognition information in the paper-sheet information storage unit and paper sheet information relating to the recognition information.

In addition, the check processing unit 224*d* serves as a similarity calculating unit that calculates a degree of similarity between paper sheet information inputted by the data receiving unit and paper sheet information corresponding to the recognition information searched by the paper-sheet information searching unit. The display processing unit 224*c* serves as: a displaying and controlling unit that causes the display unit 222 to display image data corresponding to the recognition information searched by the paper-sheet information searching unit; a displaying and controlling unit that causes the display unit to display paper sheet information received by the data receiving unit corresponding to the recognition information searched by the paper-sheet information searching unit, and image data corresponding to paper sheet information received by the data receiving unit; and a displaying and controlling unit that causes the display unit to display a degree of similarity calculated by the similarity calculating unit. In the embodiment 1, the banknote management apparatus 120 as structured above corresponds to a paper sheet management apparatus that performs management such as registration and search of information on paper sheets inputted from the banknote recognition apparatus.

In particular, the storage unit 130 of the banknote management apparatus 120 stores a table in which various data on banknotes to be dispensed that have been imaged by the imaging unit 211 for each banknote are registered (hereinafter, referred to as "banknote information table").

The banknote information table stored in the storage unit 130 of the banknote management apparatus 120 is described with reference to FIG. 3. As shown in FIG. 3, the banknote information table is a table in which serial numbers of banknotes, denominations thereof, image data thereof, and feature amount data are written in relation to each other.

As shown in FIG. 3, the banknote information table is a logical structure of a banknote information data group stored in the storage unit 130. In this table, each row has banknote information on one banknote, and one item of the banknote information is allocated to each of the rows.

The banknote information on one banknote includes items such as a serial number, a denomination, image data of a banknote corresponding to the serial number, and feature amount data of the banknote corresponding to the serial number. The denomination is an item by which banknotes are sorted by nation and by value thereof. For example, Chinese yuan has four types of banknotes, i.e., a 100-yuan banknote, which is newly issued, a 50-yuan banknote, a 20-yuan banknote and a 10-yuan banknote.

The feature amount data are measured values of banknotes put into the banknote recognition apparatus 110, which are calculated by the feature-amount-data calculating unit 214*b* for the respective properties of the banknotes for each denomination, based on various measured values measured by the imaging unit 211.

For example, when the imaging unit 211 irradiates infrared light and green light onto a banknote put into the banknote recognition apparatus 110, the feature-amount data calculating unit 214 receives four kinds of received-light results, i.e., the light of the irradiated infrared light which has transmitted through the banknote, the light of the irradiated infrared light which has been reflected on the banknote, the light of the green light which has transmitted through the banknote, and the light of the green light which has been reflected on the banknote. Then, the feature-amount data calculating unit 214 calculates feature amount data respectively from the received-light results.

Figure 4:
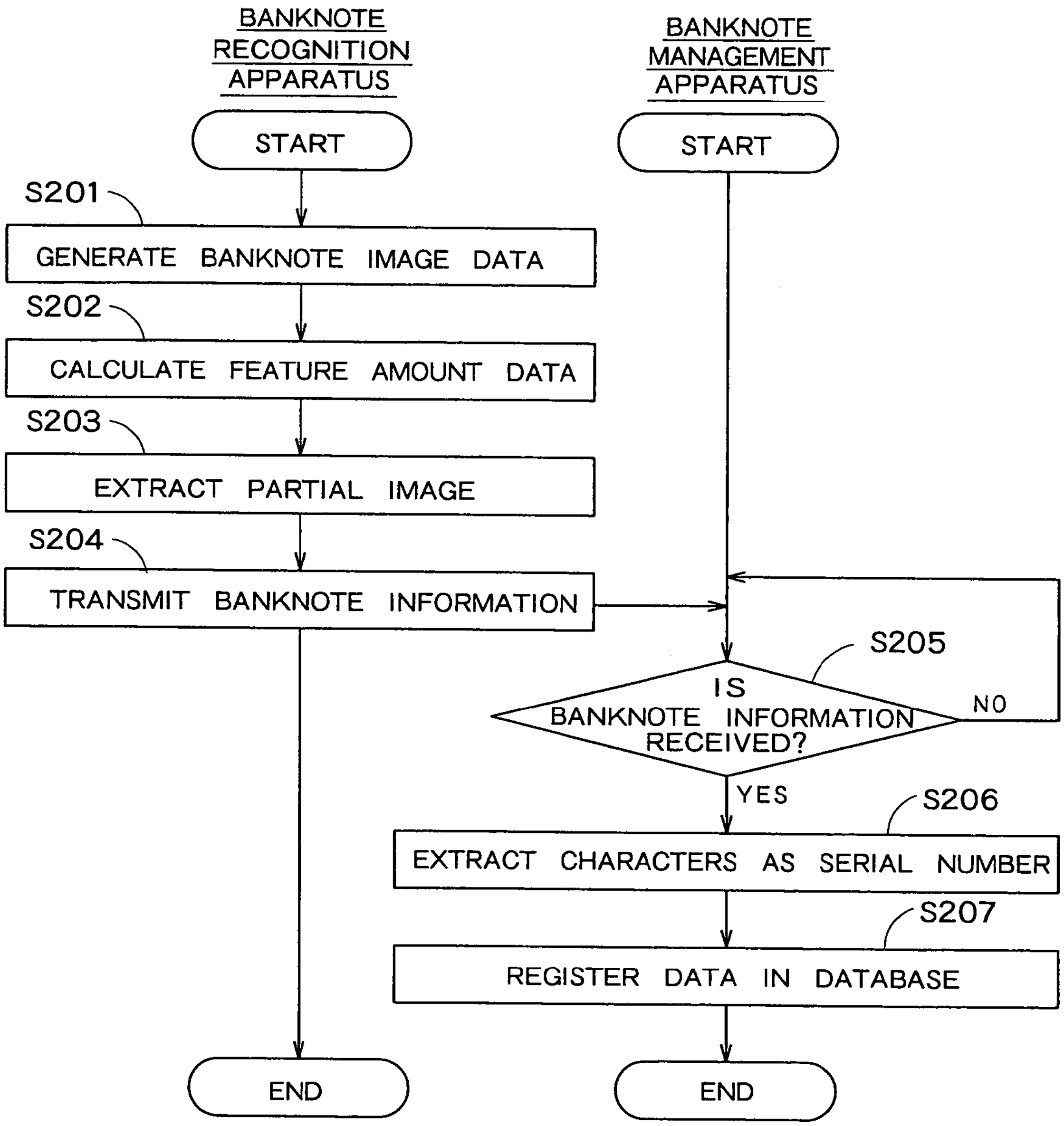
FIG. 4 is a flowchart showing processes performed by control units of the banknote recognition apparatus and the banknote management apparatus.
Figure 5:
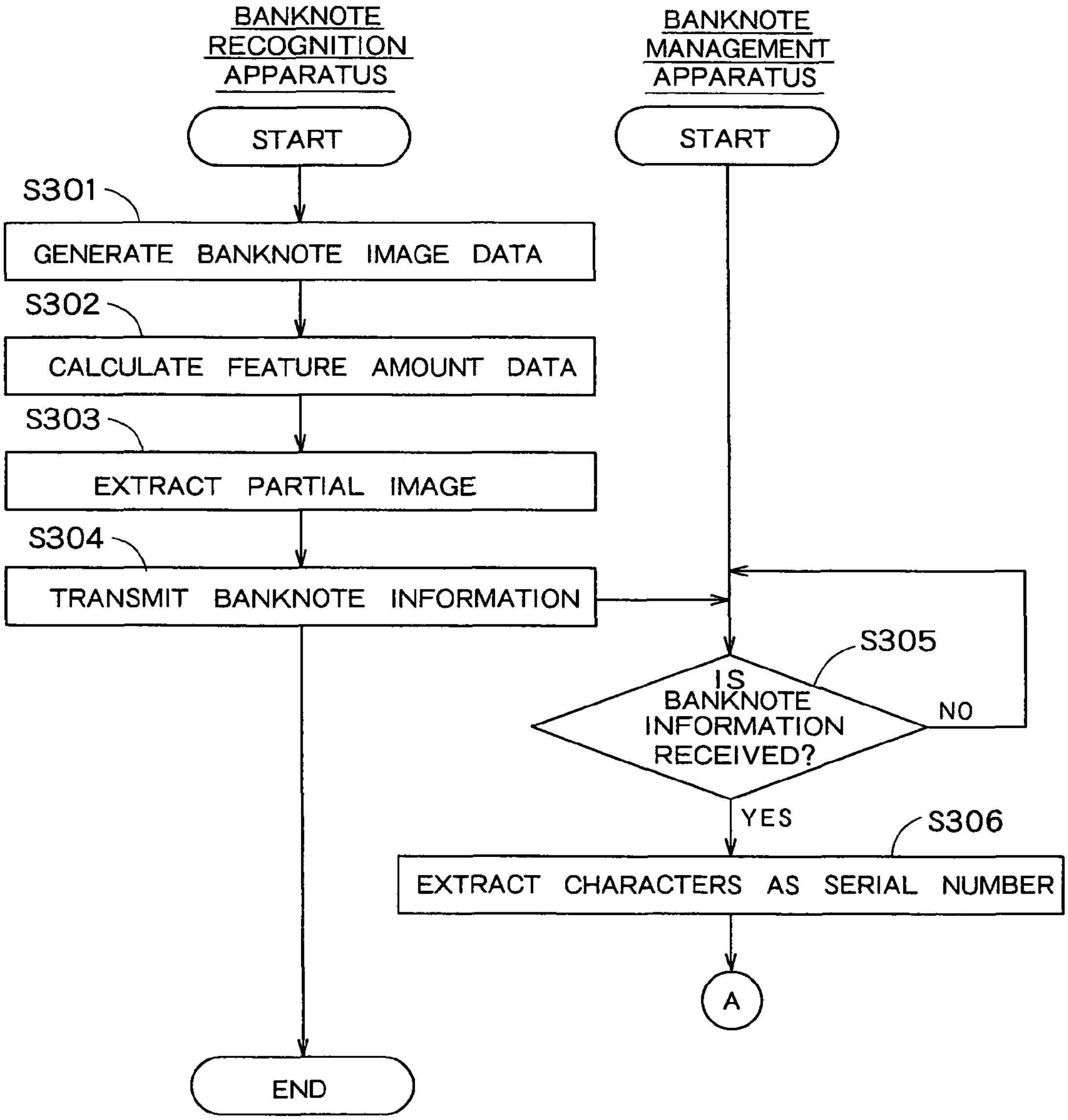
FIG. 5 is a flowchart showing processes performed by the control units of the banknote recognition apparatus and the banknote management apparatus.
Figure 6:
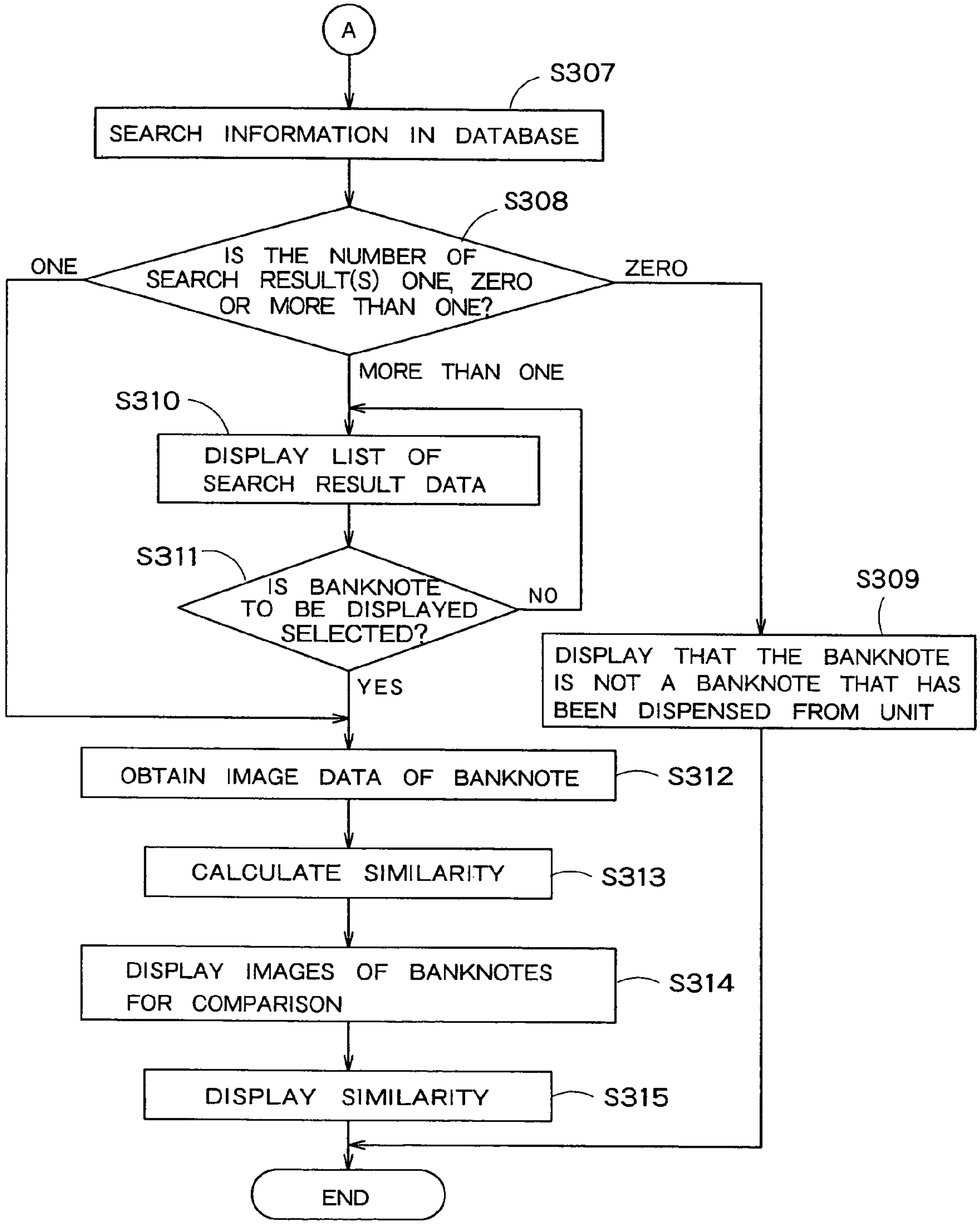
FIG. 6 is a flowchart showing processes performed by the control units of the banknote recognition apparatus and the banknote management apparatus.

Next, various information processing processes performed by the recognition control unit 214 and the management control unit 224 in the embodiment 1 are described with reference to FIGS. 4 to 6 and 8. FIGS. 4 to 6 and are flowcharts showing information processing processes performed by the recognition control unit 214 and the management control unit 224.

As shown in FIG. 4, when banknotes to be dispensed are put into the banknote recognition apparatus 110, the recognition control unit 214 causes the imaging unit 211 to image images of the respective banknotes put thereinto, and generates image data or figure data corresponding to the respective images (step S201).

Then, the recognition control unit 214 performs a step in which, from the image data or the figure data generated in the step S201, feature amount data of banknotes corresponding to the image data or the figure data are calculated (step S202), and advances the process to a step S203.

In the step S203, the recognition control unit 214 extracts images of predetermined areas in which serial numbers are included (hereinafter referred to as "partial images") from the image data generated in the step S201. Then, the recognition control unit 214 transmits, to the banknote management apparatus 120, the image data of the partial images extracted in the step S203, the image data of the whole banknotes generated in the step S201, and the feature amount data calculated in the step S202, as banknote information (step S204).

When banknotes to be dispensed are put into the banknote recognition apparatus 110, the recognition control unit 214 repeatedly performs the processes of the steps S201 to 204 to all the banknotes put thereinto.

On the other hand, the management control unit 224 judges whether banknote information transmitted from the banknote recognition apparatus 110 has been received or not (step S205). When it is judged that banknote information has not been received (step S205: No), the management control unit 224 repeatedly performs the process of the step S205, until it receives banknote information. When it is judged that banknote information has been received in the step S205 (step S205: Yes), the management control unit 224 advances the process to a step S206.

In the step S206, the management control unit 224 performs a process in which the serial numbers are recognized as characters and the recognized serial numbers are extracted from the image data of the partial images included in the banknote information received from the banknote recognition apparatus 110. Thereafter, the management control unit 224 performs a process in which the recognition number data as well as the image data and the feature amount data of the received banknote information are registered in the database 223*a* (step S207).

In the step S206, when there is a character in the serial number which cannot be recognized as a character, the management control unit 224 performs a process in which the unrecognizable character in the serial number is replaced with a predetermined character such as "?" or "*" (hereinafter referred to as "reject character").

In the step S207, the management control unit 224 causes the storage unit 130 to store the image data corresponding to the serial numbers extracted in the step S206 and the feature amount data corresponding thereto, and thereafter finishes the process.

Next, processes by the registration control unit 214 and the management control unit 224 are described with reference to FIGS. 5 to 9, the processes being performed when a basis (hereinafter referred to as "judgment basis") to judge whether or not a banknote brought by a customer is the banknote that has been dispensed from a bank, in which the paper sheet management system in the embodiment 1 is installed, is displayed on the display unit 222.

Herein, processes by the registration control unit 214 and the management control unit 224 for displaying a judgment basis of the banknote on the display unit 222, are described with reference to FIGS. 5 to 7, the processes being performed when a banknote brought by a customer is put into the banknote recognition apparatus 110 by a clerk, In addition, when a serial number of the banknote brought by the customer is inputted to the banknote management apparatus 120 by the clerk, processes performed by the registration control unit 214 and the management control unit 224 for displaying a judgment basis of the banknote on the display unit 222 are described with reference to FIGS. 8 and 9.

As shown in FIG. 5, when the banknote brought by the customer is inputted to the banknote recognition apparatus 110, the recognition control unit 214 firstly causes the imaging unit 211 to image an image of the banknote brought by the customer, and generates image data or figure data corresponding to the image (step S301).

Then, the recognition control unit 214 performs a process in which, from the image data or figure data generated in the step S301, feature amount data of the banknote corresponding to the image data or the figure data is calculated (step S302). Thereafter, the recognition control unit 214 advances the process to a step S303.

In the step S303, the registration control unit 214 extracts a partial image in which the serial number is included, from the image data generated in the step S301. Thereafter, the recognition control unit 214 transmits, to the banknote management apparatus 120, the image data of the partial image extracted in the step S303, the image data of the banknote as a whole generated in the step S301, and the feature amount data calculated in the step S302, as banknote information (step S304).

On the other hand, the management control unit 224 judges whether banknote information transmitted from the banknote recognition apparatus 110 has been received or not (step S305). When it is judged that banknote information has not been received (step S305: No), the management control unit 224 repeatedly performs the process of the step S305, until it receives banknote information. When it is judged that banknote information has been received in the step S305 (step S305: Yes), the management control unit 224 advances the process to a step S306.

In the step S306, the management control unit 224 performs a process in which the serial number is recognized as characters and extracted from the image data of the partial image included in the banknote information received from the banknote recognition apparatus 110. In the step S306, when there is a character in the serial number which cannot be recognized as a. character, the management control unit 224 performs a process in which the unrecognizable character in the serial number is replaced with a reject character such as "?" or "*".

Thereafter, the management control unit 224 advances the process to a step S307 shown in FIG. 6, and performs a search process in the database 223*a* stored in the storage unit 130. In this process, the management control unit 224 searches, with the use of the serial number data included in the banknote information received from the banknote recognition apparatus 110, a serial number which conforms to the serial number in the database 223*a*.

When a reject character is included in the serial number included in the received banknote information, the management control unit 224 searches a serial number whose characters correspond to the remaining characters of the serial number other than the reject character, in the database 223*a*.

Thereafter, in a step S308, the management control unit 224 judges whether the number of the serial number(s) falling under the search process performed in the step S307 is one, zero or more than one. When the number is one, the management control unit 224 advances the process to a step S312. When the number is zero, the management control unit 224 advances the process to a step S309. When the number is more than one, the management control unit 224 advances the process to a step S310.

Then, in the step S309, the management control unit 224 performs a process in which the display unit 222 displays an image showing that the banknote brought by the customer is not a banknote that has been dispensed from the ATM (unit) of the bank, and then finishes the process.

In the step S310, the management control unit 224 performs a process in which the display unit 222 displays a list of data (hereinafter referred to as "search result data") showing the plurality of serial numbers falling under the search process performed by the step S307, and then advances the process to a step S311.

In the step S311, the management control unit 224 judges whether a banknote to be displayed is selected or not. At this time, the management control unit 224 judges that a banknote to be displayed has been selected, when detecting that the clerk has operated the input unit 221 and selected one serial number from the list of the search result data displayed in the step S311.

Then, when it is judged that a banknote to be displayed has been selected (step S311: Yes), the management control unit 224 advances the process to a step S312. On the other hand, when it is judged that a banknote to be displayed has not been selected (step S311: No), the management control unit 224 returns the process to the step S310.

In the step S312, the management control unit 224 obtains, from the database 223*a*, the image data of the banknote selected in the step S311, and then advances the process to a step S313. The management control unit 224 performs a process in which, with the use of the image data obtained from the database 223*a* and the image data of the banknote included in the banknote information received from the banknote recognition apparatus 110, a degree of similarity between the two image data is calculated. Herein, the management control unit 224 calculates the degree of the similarity of the two image data by using a correlation function.

Thereafter, in a step S314, the management control unit 224 performs a process in which the display unit 222 displays the images of the banknotes corresponding to the two image data whose degree of similarity has been calculated. Further, the management control unit 224 performs a control by which the display unit 222 displays the degree of similarity calculated in the step S313 (step S315), and finishes the process.

Figure 7:
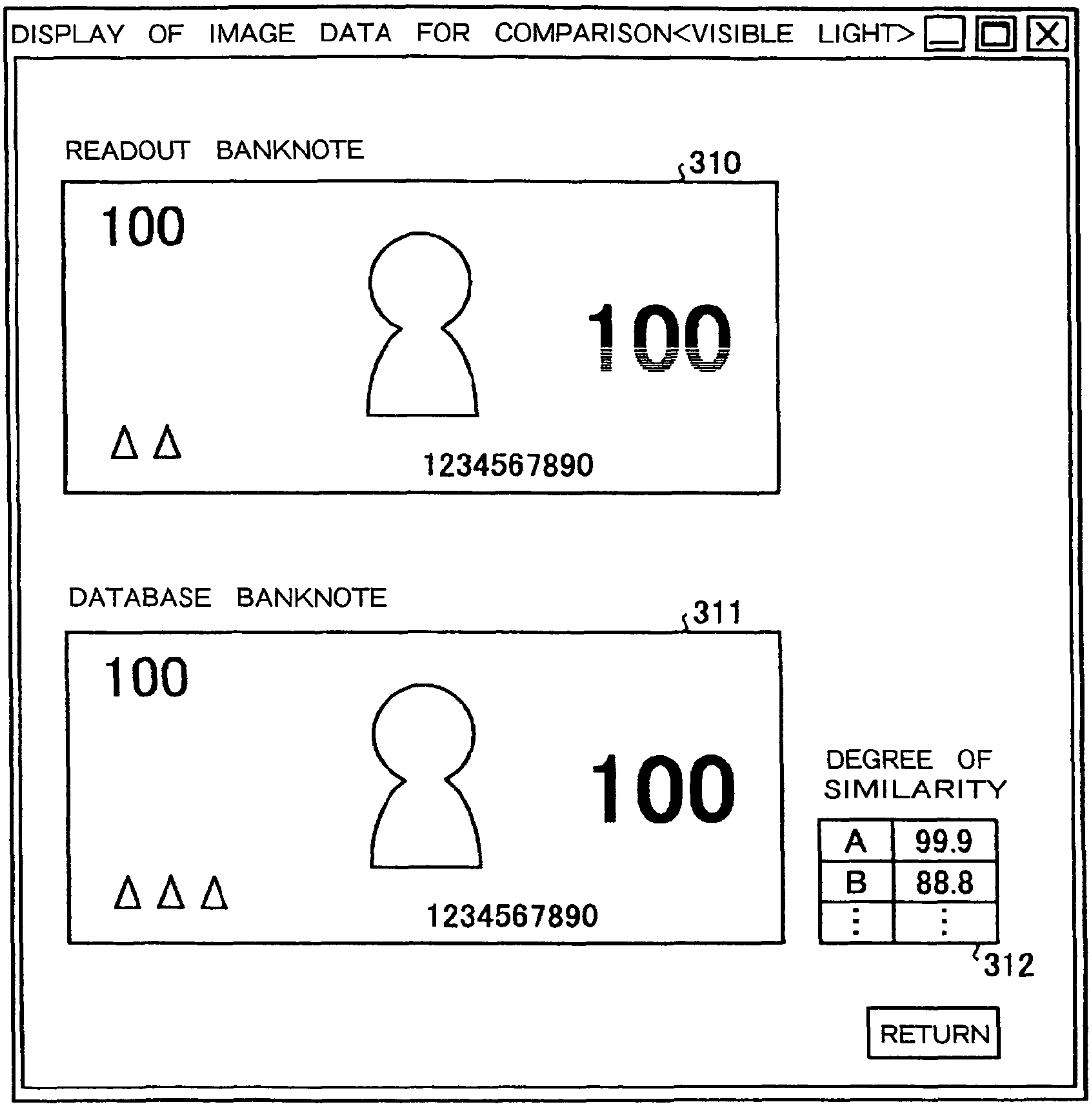
FIG. 7 is a view showing an example of a banknote search display screen image according to the embodiment 1.

As shown' in FIG. 7, the management control unit 224 displays an image 310 of the banknote brought by the customer as a readout image, on an upper part of the display area of the display unit 222. Simultaneously, the management control unit 224 displays an image 311 of the banknote obtained from the database 223*a* (image of the banknote on which a serial number the same as or similar to the serial number of the banknote brought by the customer is printed) as a database banknote 311 below the readout banknote 310. Further, the management control unit 224 displays, on the right side of the database banknote, the degree of similarity 312 between the readout banknote 310 and the database banknote 311.

Next, when the customer inputs the serial number of the banknote brought by the customer to the banknote management apparatus 120, processes performed by the registration control unit 214 and the management control unit 224 for displaying a judgment basis of the banknote on the display unit 222 are described.

Figure 8:
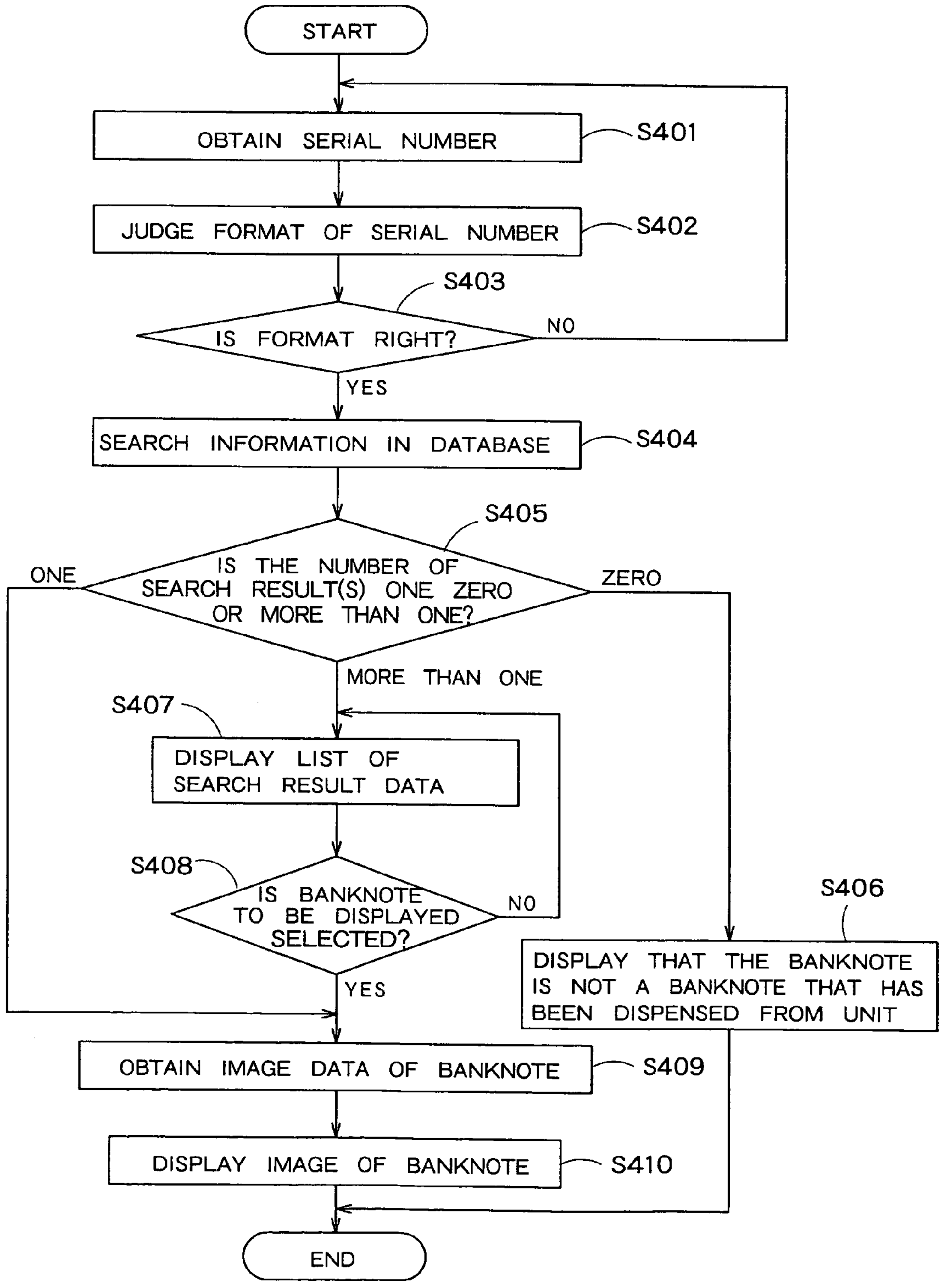
FIG. 8 is a flowchart showing processes performed by the control units of the banknote recognition apparatus and the banknote management apparatus.

As shown in FIG. 8, when the serial number of the banknote brought by the customer is inputted by the clerk to the banknote management apparatus 120, the management control unit 224 performs a process in which the serial number inputted from the input unit 221 is obtained (step S401). Then, in a step S402, a format of the serial number obtained in the step S401 is judged (step S402).

Based on the format judgment performed in the step S402, the management control unit 224 judges whether the format of the serial number obtained in the step S401 is a "proper format" or not (step S403). When it is judged that the format is proper (step S403: Yes), the management control unit 224 advances the process to a step S404. On the other hand, when it is judged that the format is not proper (step S403: No), the management control unit 224 returns the process to the step S401. Herein, when the types and the number of the characters of the serial number are the predetermined types and the number of characters, the management control unit 224 judges that the format of the serial number is proper.

Then, in the step S404, there is performed a search process in the database 223*a* stored in the storage unit 130. In this process, with the use of the data of the serial number inputted by the input unit 221, the management control unit 224 searches a serial number which conforms to the serial number in the database 223*a*.

Thereafter, in the step S405, the management control unit 224 judges whether the number of the serial number(s) falling under the search process performed in the step S404 is one, zero or more than one. When the number is one, the management control unit advances the process a step S409. When the number is zero, the management control unit 224 advances the process to a step S406. When the number is more than one, the management control unit 224 advances the process to a step S407.

In the step S406, the management control unit 224 performs a process in which the display unit 222 displays an image showing that the banknote brought by the customer is not a banknote that has been dispensed from the ATM (unit) of the bank, and then finishes the process.

In the step S407, the management control unit 224 performs a process in which the display unit 222 displays a list of the search result data showing the plural serial numbers falling under the search process performed by the step S404, and then advances the process to a step S408.

In the step S407, the management control unit 224 causes the display unit 222 to display, as the search result data, a list of the plurality of serial numbers falling under the search process performed in the step S404, and a list of plurality of kinds on images corresponding to the respective serial numbers (see, the lower part of the image shown in FIG. 9) out of which one kind is selected (out of an image of a banknote through which infrared light transmitted, an image of a banknote on which infrared light was irradiated, an image of a banknote through which green light transmitted, and so on).

In the step s408, the management control unit 224 judges whether a banknote to be displayed has been selected or not. At this time, the management control unit 242 judges that the a banknote to be displayed is selected, when the clerk operates the input unit 221 so that the management control unit 224 detects that one serial number is selected from the list of the search result data displayed in the step S407.

Then, when it is judged that a banknote to be displayed has been selected (step S408: Yes), the management control unit 224 advances the process to the step S409. On the other hand, when it is judged that a banknote to be displayed has not been selected (step S408: No), the management control unit 224 returns the process to the step S407.

In the step S409, the management control unit 224 obtains image data of the banknote selected in the step S408, and then advances the process to a step S410. In the step S410, the management control unit 224 performs a process in which the display unit 222 displays the image of the banknote corresponding to the image data obtained in the step S409, and finishes the process.

Figure 9:
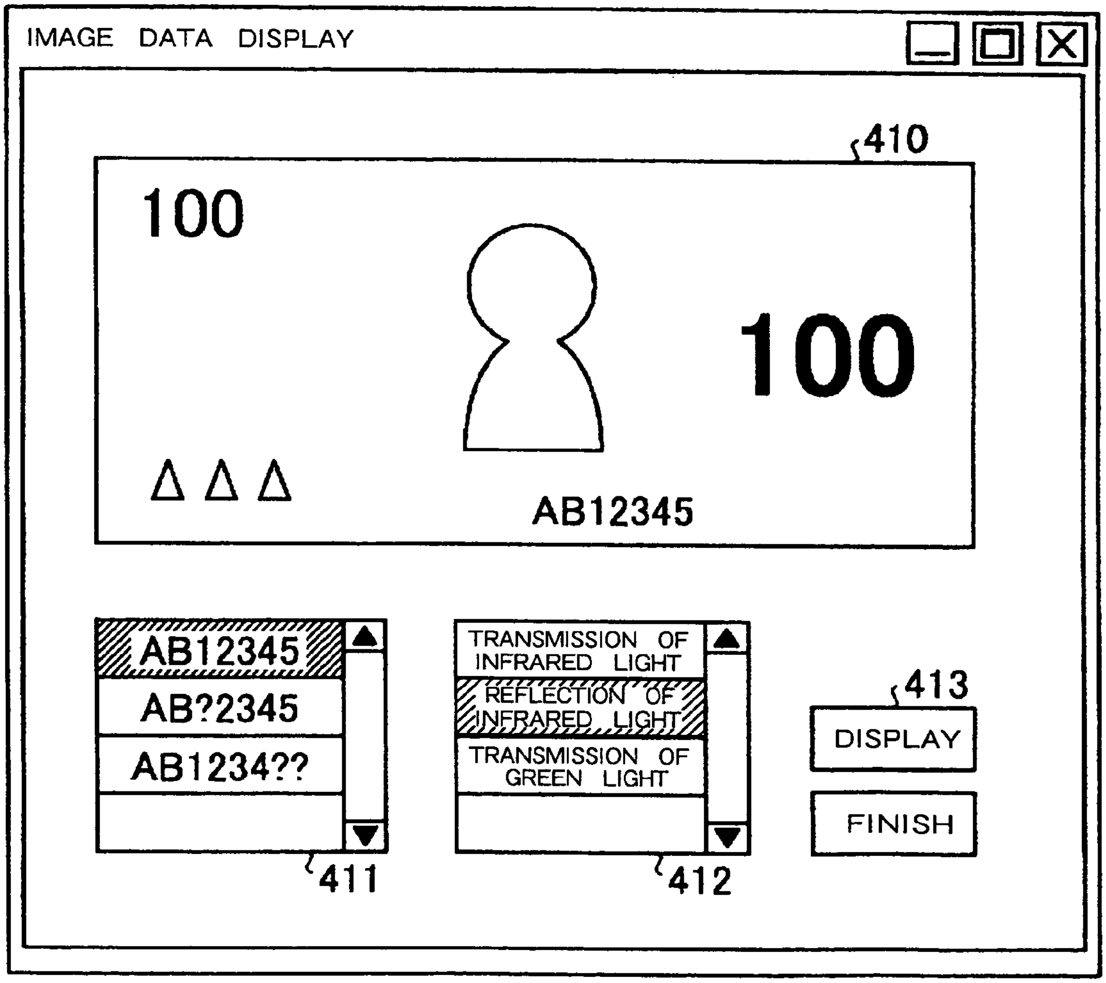
FIG. 9 is a view showing an example of the banknote search display screen image according to the embodiment 1.

At this time, as shown in FIG. 9, the management control unit 224 causes the display unit 222 to display, on an upper part of the display area, an image 410 of the banknote corresponding to the image data obtained from the database 223*a* (image of the banknote on which the same or similar serial number as or to the serial number of the banknote brought by the customer is printed).

The reference number 411 in FIG. 9 depicts a display by which one serial number is selected from the plurality of serial numbers (the same or similar serial number as or to the serial number of the banknote brought by the customer) falling under the search process performed by the step S404. The reference number 412 is a display by which one image is selected from the plural kinds of images corresponding to the respective serial numbers (an image of a banknote through which infrared light passed, an image of a banknote on which infrared light was irradiated, an image of a banknote through which green light passed, and so on). The reference number 413 depicts an icon by which an image selected by the display 411 for selecting a serial number and the display 412 for selecting the kind of image is displayed.

In the aforementioned paper sheet management system in the embodiment 1, when a banknote is brought by a customer, a clerk can demonstrate to the customer whether the banknote brought by the customer has been dispensed from the bank or not, based on the search result showing whether the serial number exists or not.

In addition, in the aforementioned paper sheet management system in the embodiment 1, when a banknote is brought by a customer, a clerk can demonstrate to the customer whether the banknote brought by the customer has been dispensed from the bank or not, and demonstrate whether the banknote is a counterfeit note or not, based on the search result of the serial number and the judgment result of identity by visual observation and a degree of similarity.

In addition, in the above embodiment 1, the banknote recognition apparatus 110 is configured to extract the partial image data of the areas on which the serial numbers of the respective banknotes are printed. However, the banknote management apparatus 120 may be configured to extract the partial image data of the areas on which the serial numbers of the respective banknotes are printed. In this case, a load of the process by the banknote recognition apparatus 110 can be reduced.

In addition, in the above embodiment 1, the banknote recognition apparatus 110 and the banknote management apparatus 120 are separated from each other. However, the banknote recognition apparatus 110 and the banknote management apparatus 120 may be integrated with each other, and all the processes in the embodiment 1 may be performed by the banknote management apparatus 120. In this case, it is not necessary to separately provide the banknote recognition apparatus 110.

In addition, in the above embodiment 1, the serial numbers, the image data and the feature amount data are stored in the storage unit 130 in a manner such that the serial numbers, the image data and the feature amount data are related to each banknote. Thus, with the use of a serial number of a banknote, a serial number, the image data and the feature amount data for each banknote, which have been previously stored before dispensed, are searched, and the search result is outputted. However, in consideration of the purpose of the present invention, i.e., to judge whether the banknote has been dispensed from the bank or not, it is sufficient that only the serial number of each banknote is stored in the storage unit 130. In this case, by outputting a result whether the serial number exists or not, whether the banknote has been dispensed from the bank or not can be easily recognized.

Embodiment 2

Figure 10:
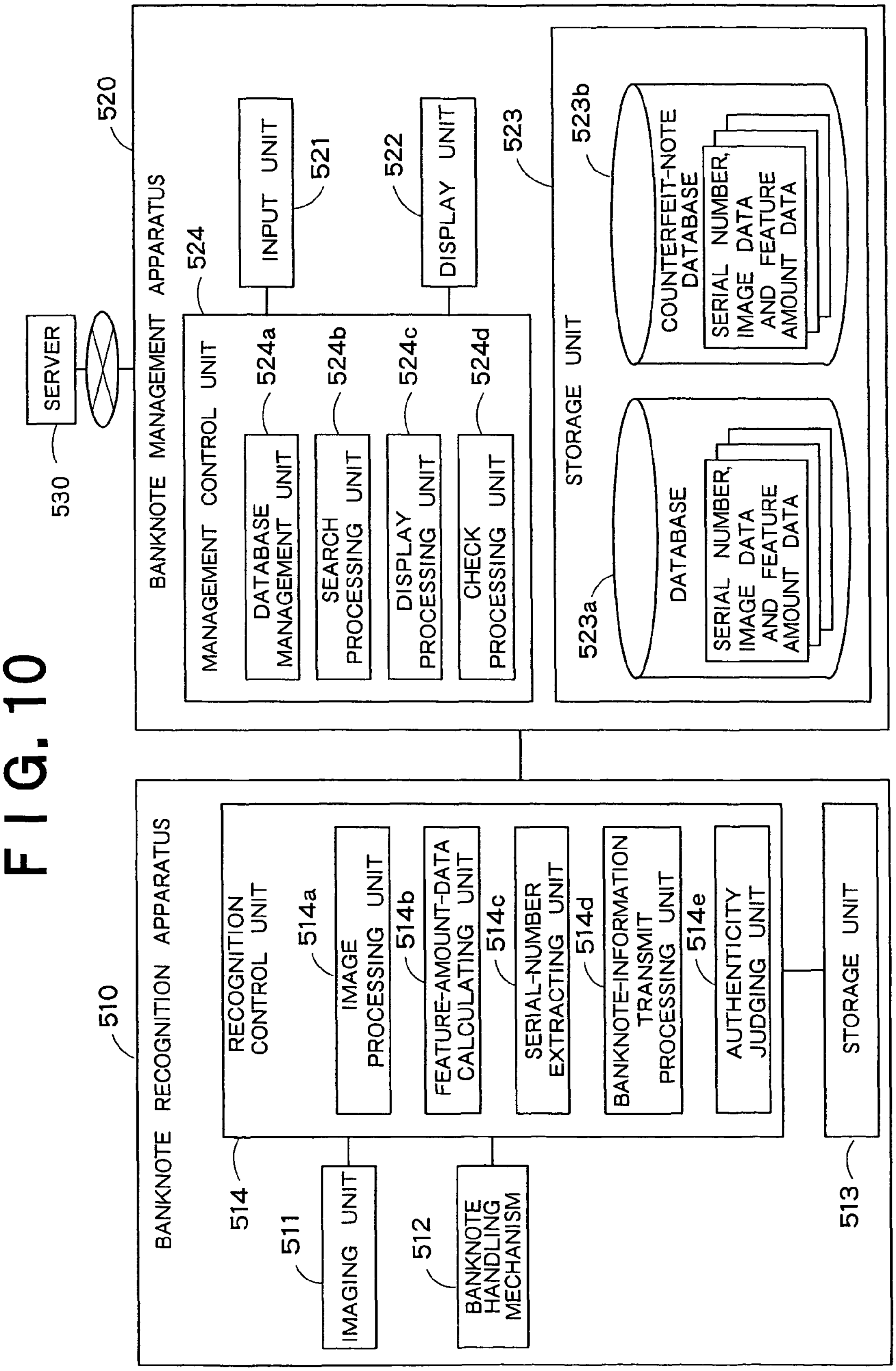
FIG. 10 is a functional block view showing structures of a banknote recognition apparatus and a banknote management apparatus according to an embodiment 2.

Next, an embodiment 2 of the paper sheet management system of the present invention is described with reference to FIG. 10. FIG. 10 is a functional block diagram showing the structures of a banknote recognition apparatus 510 and a banknote management apparatus 520.

As shown in FIG. 10, similarly to the banknote recognition apparatus 110 in the embodiment 1 shown in FIG. 2, the banknote recognition apparatus 520 in the embodiment 2 includes a imaging unit 511, a banknote handling mechanism 512, a recognition control unit 514, and a storage unit 513.

Since the imaging unit 511, the money handling system 512, and the storage unit 513 are the same as those of the banknote recognition apparatus 110 in the embodiment 1, description thereof is omitted.

Similarly to the recognition control unit 214, the recognition control unit 514 serves as an image processing unit 514*a*, a feature-amount-data calculating unit 514*b*, a serial number extracting unit 514*c*, and a banknote-information transmitting unit 514*d*, when the CPU executes various programs stored in the ROM.

Further, the recognition control unit 514 serves as an authenticity judging unit 514*e*, when the CPU executes an authenticity judgment program stored in the ROM.

In addition, similarly to the banknote management apparatus 120, the banknote management apparatus 520 in the embodiment 2 includes a management control unit 524, an input unit 521, a display unit 522, and a storage unit 523. Since the management control unit 524, the input unit 521, and the display unit 522 are the same as those of the banknote management apparatus 120 in the embodiment 1, description thereof is omitted.

Similarly to the storage unit 130 of the banknote management apparatus 120 in the embodiment 1, the storage unit 523 of the banknote management apparatus 520 stores a database 523*a* in which serial numbers, image data and feature amount data on the banknotes to be dispensed are registered. Further, the storage unit 523 stores a counterfeit-note database 523*b* in which a plurality of serial numbers on counterfeit notes, image data and feature amount data of counterfeit notes corresponding to the serial numbers.

The various data to be registered in the counterfeit-note database 523*b* is downloaded from a predetermined server 530 installed in an official security organization through a communication line, for example.

Since the banknote recognition apparatus 510 and the banknote management apparatus 520 have the above structures, when a banknote is brought by a customer, the paper sheet management system in the embodiment 2 can judge the validity of the banknote further precisely.

That is to say, in the paper sheet management system in the embodiment 2, when a banknote is brought by a customer into the bank, the banknote recognition apparatus 510 judges the authenticity of the banknote. At this time, the banknote recognition apparatus 510 images the image of the banknote, obtains image data or figure data relating the to the banknote, and obtains a serial number and feature amount data of the banknote from the image data or the figure data.

Then, based on the obtained image data, the banknote recognition apparatus 510 judges the authenticity of the banknote brought by the customer. Further, the banknote recognition apparatus 510 transmits the data showing the judgment result, as well as the thus obtained serial number of the banknote, the image data thereof, and the feature amount data thereof, to the banknote management apparatus 520.

When the judgment result of the authenticity judgment received from the banknote recognition apparatus 510 is a counterfeit note, the banknote management apparatus 520 searches, in the counterfeit-database 523*b*, the serial number received from the banknote recognition apparatus 510. When there is the same serial number as the serial number received from the banknote recognition apparatus 510 in the counterfeit database 523*b*, the banknote management apparatus 520 checks the image data and the feature amount data received from the banknote recognition apparatus 510, with the image data and the feature amount data of the banknote having the same serial number in the counterfeit-note database 523*b*.

When the received image data and the feature amount data, and the image data and the feature amount data in the counterfeit-note database 523*b* do not conform to each other, the banknote management apparatus 520 registers the serial number, the image data of the banknote and the feature amount data thereof, which are received from the banknote recognition apparatus 510, in the counterfeit-note database 523*b*.

Thus, since the paper sheet management system in the embodiment 2 can register data on a plurality of counterfeit notes having the same serial number and different image data and the feature amount data, the paper sheet management system can enrich the data in the counterfeit-note database 523*b*. Therefore, even when a skillful counterfeit note is brought into the bank, the validity of the banknote can be judged further precisely.

Moreover, in the paper sheet management system in the embodiment 2, the banknote management apparatus 520 searches, in the database 523*a*, the serial number of the banknote that is judged as a counterfeit note by the banknote recognition apparatus 510. If the same serial number as the serial number of the counterfeit note has been registered in the database 523*a*, the banknote management apparatus 520 deletes, from the database 523*a*, the serial number and the image data and the feature amount data registered correspondingly to the serial number, or switches a status thereof to be counterfeit.

Thus, in the paper sheet management system in the embodiment 2, even when a serial number of a counterfeit note and image data and feature amount data corresponding to the serial number are registered in the database 523*a* by mistake, these data can be deleted. As a result, the reliability of the database 523*a* can be improved, whereby the validity of a banknote brought by a customer can be judged further precisely.

The invention claimed is:

1. A paper sheet management system configured to obtain inputted information on a paper sheet, and to perform management such as registration and search of the information on the paper sheet comprising:

a recognition-information extracting unit configured to extract recognition information printed on the paper sheet, the recognition information uniquely identifying the paper sheet;

a paper-sheet information obtaining unit configured to obtain, as paper sheet information of the paper sheet, feature amount data showing features of the paper sheet;

a paper-sheet information storage unit configured to store the recognition information extracted by the recognition-information extracting unit and the paper sheet information obtained by the paper-sheet information obtaining unit, such that the recognition information and the paper sheet information are related to each other; and a paper-sheet information searching unit configured to search predetermined recognition information in the paper-sheet information storage unit, and to output existence or nonexistence of the recognition information in the paper-sheet information storage unit and paper sheet information corresponding to the recognition information, wherein the feature amount data includes data showing the features of the paper sheets that vary across the ages, and the features of the paper sheets that vary across the ages include at least one of fold lines, stains, minute wrinkles, and color fade-out.

2. The paper sheet management system according to claim 1, wherein the recognition-information extracting unit includes an imaging unit configured to image an image of the paper sheet, a partial-image extracting unit configured to extract a partial image of a predetermined area of the image imaged by the imaging unit, and a character recognizing unit configured to recognize, as a character, data in the partial image extracted by the partial-image extracting unit.

3. The paper sheet management system according to claim 1, further comprising an input receiving unit configured to receive an input of recognition information of a paper sheet to be searched, and a display controlling unit configured to control a predetermined display unit such that image data corresponding to the recognition information searched by the paper-sheet information searching unit are displayed on the display unit.

4. The paper sheet management system according to claim 1, further including a data receiving unit configured to receive the recognition information and the paper sheet information of the paper sheet to be searched, a similarity calculating unit configured to calculate a similarity between the paper sheet information received by the data receiving unit and paper sheet information corresponding to the recognition information searched by the paper-sheet information searching unit, and a display controlling unit configured to control a predetermined display unit such that the similarity calculated by the similarity calculating unit is displayed on the display unit.

5. The paper sheet management system according to claim 4, wherein the display controlling unit is further configured to control the display unit to display thereon image data corresponding to the recognition information searched by the paper-sheet information searching unit, and image data corresponding to the paper sheet information received by the data receiving unit.

6. A paper sheet management method for obtaining inputted information on a paper sheet, and for performing management such as registration and search of the information on the paper sheet, the paper sheet management method comprising:

extracting recognition information printed on the paper sheet, the recognition information uniquely identifying the paper sheet;

obtaining, as the paper sheet information, feature amount data showing features of the paper sheet;

storing, in a storage unit, the recognition information by the extracting of the recognition information and the paper sheet information by the obtaining of the paper sheet information, such that the recognition information and the paper sheet information are related to each other; and searching predetermined recognition information in the storage unit, and outputting existence or nonexistence of the recognition information in the storage unit and paper sheet information corresponding to the recognition information, wherein the feature amount data includes data showing the features of the paper sheets that vary across the ages, and the features of the paper sheets that vary across the ages include at least one of fold lines, stains, minute wrinkles, and color fade-out.

7. A non-volatile computer-readable storage medium storing a paper sheet management program for obtaining inputted information on a paper sheet, and performing management such as registration and search of the information on the paper sheet, the paper sheet management program being executable by a computer to perform the procedures of:

extracting recognition information printed on the paper sheet, the recognition information uniquely identifying the paper sheet;

obtaining, as the paper sheet information, feature amount data showing features of the paper sheet;

storing, in a storage unit, the recognition information by the extracting of the recognition information and the paper sheet information by the obtaining of the paper sheet information, such that the recognition information and the paper sheet information are related to each other; and searching predetermined recognition information in the storage unit, and outputting existence or nonexistence of the recognition information in the storage unit and paper sheet information corresponding to the recognition information, wherein the feature amount data includes data showing the features of the paper sheets that vary across the ages, and the features of the paper sheets that vary across the ages include at least one of fold lines, stains, minute wrinkles, and color fade-out.

8. The paper sheet management system according to claim 1, wherein the recognition-information extracting unit obtains image data of the paper sheet, the paper-sheet information obtaining unit obtains the feature amount data from the image data, and the paper-sheet information storage unit stores the recognition information, the image data, and the feature amount data such that the recognition information, the image data, and the feature amount data are related to each other.

9. The paper sheet management method according to claim 6, wherein the feature amount data is obtained from image data of the paper sheet, and the recognition information, the image data, and the feature amount data are stored in the storage unit such that the recognition information, the image data, and the feature amount data are related to each other.

10. The non-volatile computer-readable storage medium according to claim 7, wherein the feature amount data is obtained from image data of the paper sheet, and the recognition information, the image data, and the feature amount data are stored in the storage unit such that the recognition information, the image data, and the feature amount data are related to each other.

* * * * *